Patented Nov. 1, 1932

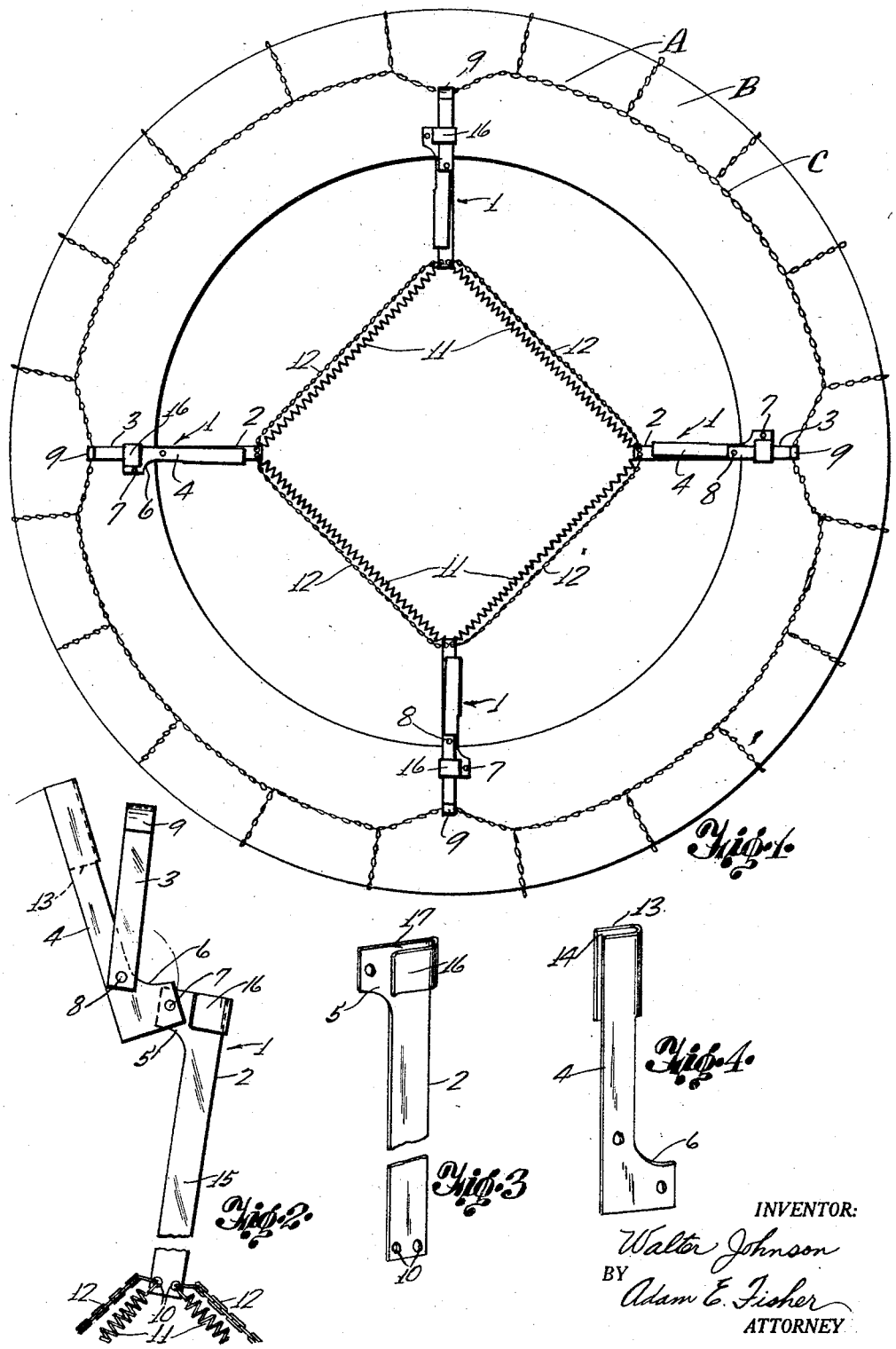

1,885,603

UNITED STATES PATENT OFFICE

WALTER JOHNSON, OF EAST AUBURN, MAINE

TIRE CHAIN TIGHTENER

Application filed May 14, 1931. Serial No. 537,301.

My invention relates to tire chain tighteners or devices for tightening motor vehicle tire chains and maintaining the same in a taut condition in use. The main object of the invention is to provide a tire chain tightener which may be readily applied to the tire chain and then quickly and conveniently operated without the use of any tools to pull the chain taut upon the tire.

Another object is to provide a tightener including a plurality of stretching lever assembles hooked at their outer ends at intervals around the tire chain and connected by their inner ends to flexible resilient stretching elements adapted to exert a pull upon the chain, each stretching element being protected by an equalizing chain which will act to evenly distribute the strain upon the other stretching elements should one break thus preventing loosening of the tire chain or loss of the tightener.

Another object is to provide a tire chain tightener in a simple, durable and efficient form.

With these and other objects in view the invention resides in the novel construction and arrangement of parts as hereinafter set forth and claimed, reference being had to the accompanying drawing wherein:

Figure 1 is a side elevation of a tire and chain equipped with the invention.

Figure 2 is an enlarged detail view showing one of the stretching and locking mechanisms in its opened or expanded position.

Figure 3 is a perspective view of the inner connecting link of the stretching mechanism shown in Figure 2.

Figure 4 is a similar view of the operating lever used in the stretching mechanism.

In carrying out the invention I provide a plurality of expansible stretching mechanisms 1 each of which comprises three pivotally connected elements hereinafter referred to as the inner connecting link 2, outer connecting link or hook 3 and operating lever 4. The outer end of the inner link 2 has a laterally projecting or extending ear 5 and one end of the operating lever 4 is similarly formed with a laterally extending ear 6 and these ends are pivotally connected by a rivet or similar fastener 7. The inner end of the outer link 3 is pivoted by a rivet or similar fastener 8 to the conecting lever 4 inwardly from the end bearing the ear 6. The pivotal connection between the inner link 2 and operating lever 4 is offset laterally from their longitudinal centers or axes by the lateral extended ears 5 and 6 at their ends for a purpose to be described. The outer end of the outer links 3 is hooked as shown at 9 and the inner end of the inner link 2 is provided with two spaced apertures 10. A plurality of retractile coil springs 11 and equalizing chains 12 are provided. In applying the foregoing elements to the conventional tire chain A mounted upon the tire B shown in Figure 1 four of the stretching mechanisms 1, four springs 11 and four chains 12 are employed though it is obvious that more or less may be used as desired. The ends of the springs 11 are hooked in the apertures 10 in the inner ends of the inner links 2, each link being thus connected to the ends of two springs and each link being connected to the other by one spring in the manner shown. The equalizing chains 12 are also hooked or otherwise secured at their ends in the apertures 10 in the links 2 each chain thus extending along or flanking one of the springs 11. With the stretching mechanisms 1 opened as shown in Figure 2 the hooks 9 on the outer links 3 are hooked over the side or runner chain C of the tire chain A at equispaced points as shown in Figure 1. The operating levers 4 are then swung inward at their outer ends pivoting or fulcruming on the points 8 and pulling outward on the inner links 2 as will be apparent. This outward pull on the inner links 2 will result in the stretching of the springs 11 and the inward pull thus exerted by the springs will be transmitted to the side chain C pulling the chain inward and tight upon the tire B. The operating levers 4 are swung inward until they lie in substantially alignment with the inner links 2 at which point the stretching mechanisms are in their closed position as shown in Figure 1. When in this closed position the points 7 at which the ends of the inner links 2 and the operating levers 4 are connected are swung to a point laterally offset from the longitudinal axes of the stretching mechanisms as a whole and the tension of the springs 11 as exerted upon the inner links 2 thus results in an inward pull on the laterally extended ends 6 of the operating levers 4 tending to continue the swing of the levers 4 in the direction of the movement in closing the stretching mechanisms. The outer or free ends of the operating levers 4 have lugs or wings 13 bent outwardly and then inwardly laterally across the end portions of the levers in spaced relationship thereto thus providing clefts 14 into which the shank portions 15 of the inner links 2 will enter when the levers are swung inward into alignment therewith as described. By this engagement of the lugs 13 with the links 2 the aforesaid continuation of the movement of the lever 4 under the influence of the offset inward pull upon their laterally extended ends 6 is prevented so that this inward strain exerted by the springs will result in holding the stretching mechanisms in their closed position. For the same purpose lugs or wings 16 are provided on the outer ends of the inner links 2 and are bent laterally across the end portions there forming clefts 17 into which the outer links 3 will enter. In addition to their function as stops as above described the lugs 13 and 16 will act to make the stretching mechanisms more rigid when in their closed position as will be understood.

The equalizing chains 12 are of such length that their slack will be substantially taken up when the springs 11 are stretched by the closing of the stretching mechanisms 1. Should then one of the springs 11 become broken the chain alongside that spring will hold the stretching mechanisms connected and will transmit the tension of the remaining springs to the stretching mechanisms to which the broken spring was connected thus keeping the tire chain taut and preventing the loss of the tightener. Even should two of the springs 11 break the chains 12 will continue to maintain the tightener in an operative condition. To release the device from the chain it is only necessary to swing the free ends of the operating levers 4 outward as will be understood.

From the foregoing it will be apparent that I have provided a novel and efficient device which may be readily mounted on or removed from the tire chain and which will hold a chain tight at all times.

While I have herein set forth a certain preferred embodiment of my invention it is understood that I may vary from the same in minor structural details so as best to construct a practical device for the purposes intended, not departing from the spirit of the invention and within the scope of the appended claims.

I claim:
1. In a device of the kind described, a plurality of expansible stretching mechanisms, hooks on one end of the stretching mechanisms and resilient connecting elements connecting the other ends of the stretching mechanisms, and equalizing chains connected to the said stretching mechanisms and disposed alongside the resilient connecting elements.

2. In a device of the kind described, a plurality of expansible stretching mechanisms comprising operating levers and inner and outer connecting links, the inner connecting links being pivoted to the operating levers adjacent the ends thereof and the outer connecting links being pivoted to the operating levers at a point remote from the ends to which the inner links are pivoted, and retractile coil springs connected between the ends of the inner connecting links, and equalizing chains connected between the inner connecting links alongside the said coil springs.

3. In a device of the kind described, a plurality of expansible stretching mechanisms, hooks on the stretching mechanisms, retractile coil springs connecting the stretching mechanisms, and equalizing chains connected to the stretching mechanisms and disposed alongside the springs, the said equalizing chains being slightly longer than the springs when the latter are stretched by the stretching mechanisms.

In testimony whereof I affix my signature.
WALTER JOHNSON.